(12) United States Patent
Carroll et al.

(10) Patent No.: US 9,554,523 B2
(45) Date of Patent: Jan. 31, 2017

(54) PASSIVE SOLAR GREENHOUSE

(71) Applicants: Terry Neal Carroll, Boone, NC (US); Michael Robert Duus, Pine Grove, PA (US)

(72) Inventors: Terry Neal Carroll, Boone, NC (US); Michael Robert Duus, Pine Grove, PA (US)

(*) Notice: Subject to any disclaimer, the term of this patent is extended or adjusted under 35 U.S.C. 154(b) by 104 days.

(21) Appl. No.: 14/428,315

(22) PCT Filed: Sep. 13, 2013

(86) PCT No.: PCT/US2013/059599
§ 371 (c)(1),
(2) Date: Mar. 13, 2015

(87) PCT Pub. No.: WO2014/043436
PCT Pub. Date: Mar. 20, 2014

(65) Prior Publication Data
US 2015/0223407 A1 Aug. 13, 2015

Related U.S. Application Data

(60) Provisional application No. 61/743,797, filed on Sep. 13, 2012.

(51) Int. Cl.
*A01G 9/00* (2006.01)
*A01G 9/14* (2006.01)
*A01G 9/24* (2006.01)

(52) U.S. Cl.
CPC .................. *A01G 9/14* (2013.01); *A01G 9/243* (2013.01); *Y02P 60/124* (2015.11)

(58) Field of Classification Search
CPC .......... A01G 9/14; A01G 9/243; Y02P 60/124
USPC ............................................................. 47/17
IPC ...................................................... Y02P 60/124
See application file for complete search history.

(56) References Cited

U.S. PATENT DOCUMENTS

| 4,249,340 A * | 2/1981 | Maes, Jr. ............... A01G 9/243 47/17 |
| 4,462,390 A * | 7/1984 | Holdridge .............. A01G 9/243 126/400 |
| 4,622,950 A * | 11/1986 | Greenbaum ......... A01G 9/1415 126/618 |
| 8,215,054 B2 * | 7/2012 | van Dijk .................. A01G 9/14 47/17 |
| 8,578,650 B2 * | 11/2013 | Myntti ................... A01G 9/243 47/17 |
| 9,068,755 B2 * | 6/2015 | Spear ........................ F24J 2/34 |

(Continued)

*Primary Examiner* — Kristen C Hayes
(74) *Attorney, Agent, or Firm* — Seattle Patent Group LLC; James Haugen

(57) ABSTRACT

The present invention is directed to a passive solar greenhouse for controlling the greenhouse's interior environment and maximizing photosynthetic metabolism within the plants grown therein through regulation of sunlight, temperature, humidity, and carbon dioxide levels and methods optimizing plant growth conditions by using passive solar greenhouse of the present invention. Generally the greenhouse has a sloped glazed face which faces substantially true south in the Northern hemisphere and substantially true north in the Southern hemisphere with a predetermined slope angle designed to maximize incident solar radiation (insolation) and increase the interior temperature during the colder months of the year while reducing overheating during the warmer months of the year.

24 Claims, 16 Drawing Sheets

(56) References Cited

U.S. PATENT DOCUMENTS

2008/0034681 A1\* 2/2008 McDonald .............. E04B 7/022
　　　　　　　　　　　　　　　　　　　　52/93.1

\* cited by examiner

PASSIVE SOLAR GREENHOUSE

FIELD

The present invention is directed to passive solar greenhouses. In particular, the present invention relates to a passive solar greenhouse system that offers improved performance over existing passive solar heating designs, particularly, in the colder climates of locations in the middle and upper latitudes.

BACKGROUND

For people who live in areas that experience harsh winter climates, growing flowers, herbs, fruits and vegetables year-round is very difficult. In those environments, greenhouses are effective. A greenhouse is a structure, usually enclosed by glass or plastic (glazing), which helps to maintain an adequate temperature range throughout the year and a measure of control over the environment for growing healthy plants.

Generally speaking there are two types of greenhouse design; conventional and passive solar. Both types of greenhouses serve the same function, which is to provide an internal environment conducive to plant growth. There are, however, important differences in design and operation to consider.

Conventional greenhouses are designed to harness the sun's energy in the form of light for plant growth. Typically, conventional greenhouses are constructed of transparent, uninsulated glass or plastic. Ideally, these designs allow light in during the day for photosynthesis and heat. Overheating frequently occurs and is a problem with these designs. Furthermore, the poor insulative quality of the glass and plastics often leads to a detrimental loss of heat at night requiring supplemental heat sources, such as $CO_2$ producing fossil fuels like natural gas or propane. This requires large amounts of energy, especially in colder regions, and is a major on-going expense that decreases the profit margin of the grower, or is passed on to the consumer through higher product cost. Many conventional greenhouses are oriented with the axis in a north-south direction, which does not optimize use of the low angle winter sun, which stays close to the southern horizon during the coldest time of the year.

The term passive solar greenhouse generally refers to greenhouses designed to harness the sun's energy to use for both light and heat during cold winter months. The three basic elements of passive solar greenhouses are; an efficient collection of solar energy, the storage of solar energy as heat, and the prevention of heat loss during and following collection periods. It is these characteristics that separate passive solar greenhouses from conventional greenhouses.

Plants use the energy in sunlight to convert $CO_2$ (from the air) and water (from the soil) into sugars—a process called photosynthesis. The sugars are used to metabolize and to build new stems and leaves and when plants burn their sugars for food. $CO_2$ is produced as a waste product. Since photosynthesis is powered by sunlight, plants absorb more $CO_2$ than they give off during the daytime, but at night, when photosynthesis is dormant, the opposite occurs.

A greenhouse uses a few basic scientific principles to maintain its interior microclimate. Sunlight is the primary source of heat for a passive solar greenhouse. Sunlight passes through transparent materials, such as glass or clear plastic and when it hits an opaque, or less transparent surface, some of that light is transformed into heat. The darker the surface, the more light gets transformed into heat.

In most traditional greenhouses comprised of glass or plastic, there is almost always some heat loss which requires additional heat sources to maintain acceptable temperatures during colder periods. The goal is to trap energy inside the greenhouse to comfortably heat the plants, the ground, and soil inside it. Ideally, the air near the ground is warmed and prevented from rising and dissipating too quickly. In order for plants to flourish, a greenhouse must provide the appropriate amounts of light humidity, and warmth and the key to operating an effective greenhouse is being able to maintain a reasonably stable climate to support plants.

Air movement also has a large impact on the morphology, physiology, and reproduction of the plants as it affects the temperature of the leaf, gas exchanges and resistance of the boundary layer and, therefore, photosynthesis, transpiration and water use. Limited air movement, for example, hinders the supply of $CO_2$ to the stomata of the leaves for photosynthesis. Therefore, it is necessary to achieve a minimum horizontal air movement for $CO_2$ supply to the leaf stomata. Increases in $CO_2$ levels generate an increase in photosynthesis and subsequent increase in yield as well as induces an improvement in the water use efficiency. The recommended $CO_2$ concentration depends on the species and variety, as well as the environmental conditions. For vegetables, it has been recommended not to exceed 1500 ppm for cucumber or 1000 ppm for tomato and pepper. Recently, 1000 ppm has been considered a suitable maximum limit for all species except cucumber, aubergine, and gerbera. An excess in $CO_2$ in tomato plants may cause abnormally short leaves or the rolling of the leaves, whereas in other crops it may cause leaf chlorosis. Ventilation is the most economic method to limit $CO_2$ depletion in the greenhouse air; however, in most contemporary systems it only allows the maximum to reach ambient conditions (350-400 ppm).

During the day (photosynthesis), plants will generally use twice as much $CO_2$ than they give off from cellular metabolism. After the photosynthetic period, plants will continue respiring and give off $CO_2$ without using any, so that there can be a buildup above ambient levels overnight in a well-insulated greenhouse for the start of photosynthesis the next morning.

Thus, there is a delicate balance between maintaining proper $CO_2$ concentrations and temperatures within the greenhouse. To date, the most effective way to maintain control over the internal greenhouse $CO_2$ concentrations has been via the application of pure $CO_2$ combustion gasses, enrichment with small burners, or enrichment from a central boiler. However, these methods are expensive and wasteful.

Light regulation is practiced in a greenhouse for reasons including altering the length of daylight hours (increasing or reducing them) and increasing photosynthesis (complementing the naturally available light and/or extending the length of the day with artificial light. The objective is to maximize photosynthesis by maximizing the light interception by the greenhouse. Standard techniques employed in greenhouse design have been via supplementary artificial lighting techniques, such as lamps, etc. But again, such techniques require an energy source, such as electricity and are thus expensive to use and maintain.

As mentioned above, plant cultivation in climates that experience temperatures below the plant's ideal growth temperature range relies on a controllable microclimate often provided by greenhouses. When these greenhouses experience interior temperatures that fall outside the plant's ideal growth temperature range, the majority of these greenhouses rely on either 1) active heating methods from fossil fuels or electricity driven heaters to raise the interior temperature or 2) active ventilation from electric-driven fans to exhaust heat to lower the interior temperature to maintain the correct temperature range. Additionally (as discussed above), these greenhouses may use electric grow lights to increase photosynthetic light available to these plants. These greenhouses frequently experience carbon dioxide levels below the outside (ambient) levels during the photosynthetic period and often require carbon dioxide enrichment equipment, to optimize plant productivity during the photosynthetic period.

Passive solar greenhouses have been recognized as offering tremendous promise for growing winter crops in areas in the northern hemisphere. For example, the increasing popularity of the "Chinese Solar Greenhouse" has greatly reduced energy demand and carbon dioxide emissions throughout China and elsewhere. Gao L-H, Qu M, Ren H-Z, Sui X-L, Chen Q-Y, and Zhang Z-X. *Structure, function, application, and ecological benefit of a single-slope, energy-efficient solar greenhouse in China*. HorTechnology, June 2010 20(3) 626-631. However, the authors also cite problems associated with the Chinese solar greenhouse design including severe $CO_2$ depression, high humidity levels, low light intensity, overheating in the spring and fall, and the need for much better thermal mass. Other standard greenhouse problems include phototropism (e.g., growth or movement of a sessile organism toward or away from a source of light), winter heating and protection from extreme weather events.

Problems such as these are addressed by the current system. Through the techniques and construction described herein, the current system is able to affect the critically important levels of temperature, humidity, carbon dioxide, and natural light to maximize plant production in the system, and require only seeds, soil (nutrients), and water as external inputs. Worldwide, conventional greenhouse designs ignore many of these parameters then add energy intensive systems as mentioned above to correct the inherent weaknesses of their designs. The current system uses a unique combination of design features to create a passive system that eliminates or greatly reduces the input of active, or fossil fuel and electric driven systems, to control the greenhouse's interior temperature, light levels, humidity levels and carbon dioxide levels. The design allows for better capture, distribution, storage, and release of solar energy or its thermal energy form for enhanced winter plant growth and greatly reduces the costs associated with heating, grow lights, active ventilation, and carbon dioxide enrichment.

SUMMARY OF THE INVENTION

A general object of the present invention is to provide a passive solar greenhouse and greenhouse system for controlling the greenhouse's interior environment and maximizing photosynthetic metabolism within the plants grown therein, through regulation of sunlight, temperature, humidity, and carbon dioxide levels, Also an object of the present invention is to provide a passive solar greenhouse and greenhouse system for controlling the greenhouse's interior environment with a sloped face which faces substantially true south in the Northern hemisphere and substantially true north in the Southern hemisphere with a predetermined slope angle designed to maximize incident solar radiation (insolation) and increase the interior temperature during the colder months of the year while reducing overheating during the warmer months of the year.

Another object of the present invention is to provide a passive solar greenhouse and greenhouse system for controlling the greenhouse's interior environment with a sloped roof with a predetermined slope angle designed to maximize reflection of sunlight entering the greenhouse structure down to the plants growing within the structure.

A further object of the present invention is to provide a passive solar greenhouse and greenhouse system for controlling the greenhouse's interior environment with a ventilation/convection system comprising air intake units and air exhaust units which work concertedly to regulate humidity, temperature, and $CO_2$ levels.

Still a further object of the present invention is to provide a passive solar greenhouse and greenhouse system for controlling the greenhouse's interior environment with the application of thermal mass which provides heat at night and during colder periods and suppresses dramatic internal temperature fluctuations due to the availability of sunlight and external temperature changes.

In addition, a further object of the present invention is to provide a passive solar greenhouse and greenhouse system for controlling the greenhouse's interior environment with application of red and/or blue thermal mass designed to reflect light in the photosynthetic active spectra most beneficial to plant growth by increasing available light in wavelengths needed for photosynthesis and reducing phototropism.

Briefly described, the passive solar greenhouse of the present invention generally comprises a first vertical face, first sloped face, a second vertical face, a second sloped face, a first side wall, and a second side wall. In one embodiment, the first sloped face has a glazed surface with a slope angle designed to maximize insolation during colder months and minimize insolation during warmer months to prevent overheating of the internal space. In yet another embodiment, the second sloped face has a slope angle designed to maximize reflection of incoming solar rays toward the plant growth space during colder months. The solar greenhouse further comprises air intake units and air exhaust units which work cooperatively to generate a convective flow of air from the intake units through the greenhouse structure and out the exhaust units wherein the fresh air is mixed with the existing internal air thereby modifying the internal temperature, humidity, and $CO_2$ levels. In one embodiment, the air intake units comprise thermal vents positioned in first vertical face. In another embodiment, the air intake units comprise air intake pipes. In yet another embodiment, the air exhaust units are vents positioned within first and second side walls. The solar greenhouse may further comprise thermal mass which suppresses internal temperature fluctuations. In one embodiment, the thermal mass used is one or more water-filled containers. In yet another embodiment, the one or more water-filled containers are metal containers painted black, red and/or blue. In yet another embodiment, the thermal mass is a phase change material or even combinations of phase change material and water-filled containers. The solar greenhouse may be positioned such that the first sloped face and first vertical face faces substantially true south when the structure is located in the Northern hemisphere and substantially true north when the structure is located in the Southern hemisphere. In one embodiment, the passive solar greenhouse system is positioned such that the first sloped face and the first vertical face faces substantially true south with a margin of error of 20° toward the east or 10° toward the west when the greenhouse is in the Northern hemisphere.

The foregoing and other features, objects, and advantages of the invention will become more apparent from a reading of the following detailed description in connection with the accompanying drawings.

DETAILED DESCRIPTION

Further scope of applicability of the present invention will become apparent from the description of representative embodiments given herein. However, it should be understood that the description and specific examples, while indicating embodiments of the invention, are given by way of illustration only since various changes and modifications within the spirit and scope of the invention will become apparent to those skilled in the art.

Figure 1A:
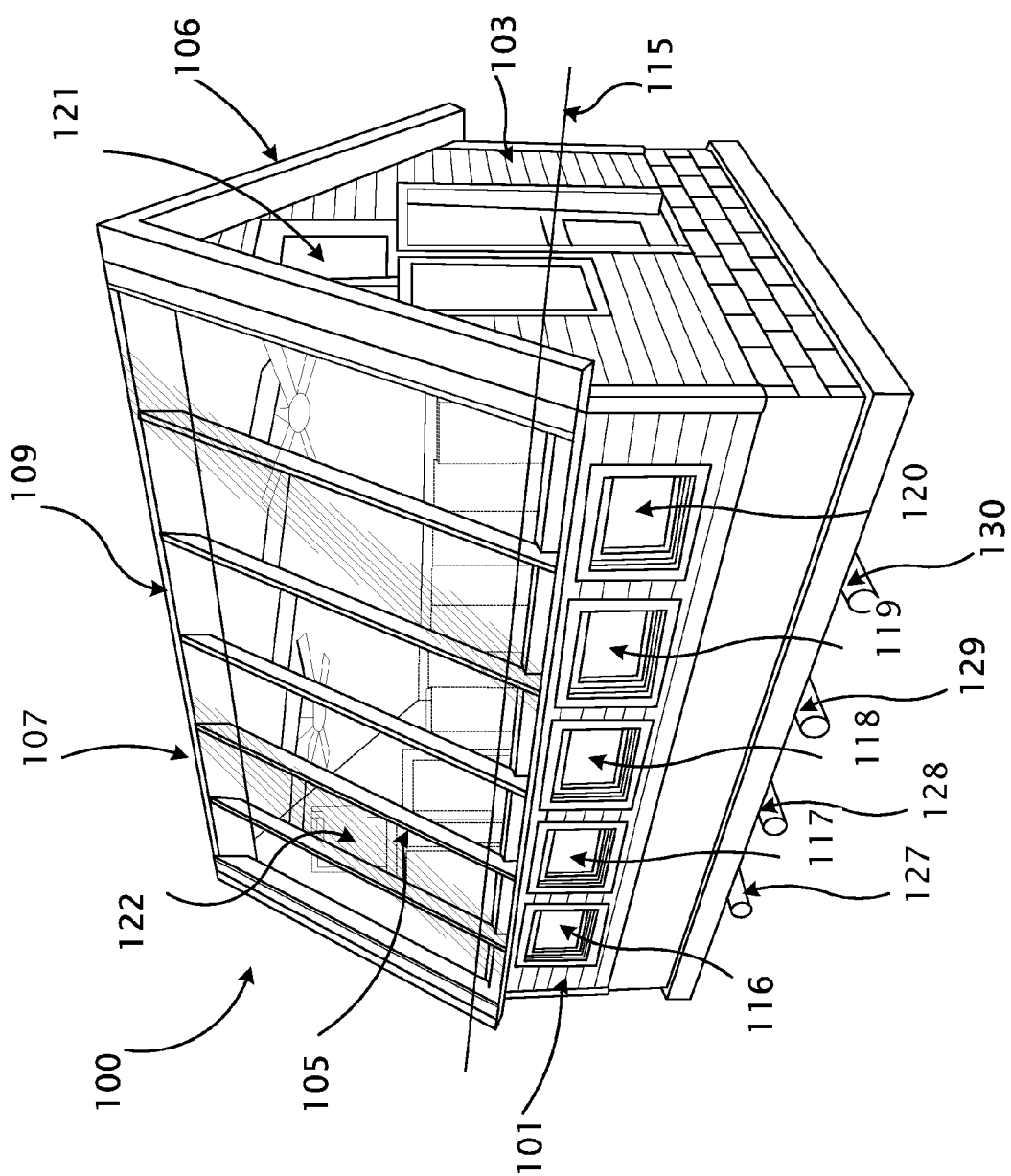
FIG. 1A shows a frontal view of an embodiment of a finished passive solar greenhouse of the present invention.

Reference is made to FIG. 1 (FIGS. 1 A and 1 B) which illustrates a basic overall design schematic of an embodiment of the present invention. In the embodiment depicted in FIG. 1, the solar greenhouse structure 100 generally comprises a first vertical face 101, a second vertical face 102, a third vertical face 103, a fourth vertical face 104 (not shown in FIG. 1), a first sloped face 105, and a second sloped face 106. Referring now to FIG. 2, the first sloped face 105 and the second sloped face 106 converge until their upper edges (107, 108 respectively) meet at ridge or apex 109. The first vertical face 101 and the first sloped face 105 intersect at junction 110 to form first interior angle 111. Likewise, the second vertical face 102 and the second sloped face 106 intersect at junction 112 to form second interior angle 113. Each face described above (vertical and sloped) has an interior surface and an exterior surface. The solar greenhouse system furthermore comprises a floor 114 (substantially along the horizontal plane) as well as an axis 115 (as shown in FIG. 1A) which runs down the length of the structure (substantially east/west).

Maximizing solar energy capture is an important factor in the photosynthetic and thermal success of the solar greenhouse system of the present invention. In some embodiments, first sloped face 105 may be glazed or manufactured of rigid or flexible plastic materials which allow suitable light, penetration, strength, and insulation. For example, polyethylene plastic sheeting may be used and is suitable for the present invention. In other embodiments, polycarbonate (rigid) plastic panels may be used offering durability, insulative quality, and resistance to projectile impact. The material may be lightweight and ribbed to provide a diffused, UV protecting light which enhances plant growth and helps aid in temperature control. In some embodiments, the polycarbonate sheets may be layer constructed and connected by ribbed channels. Other examples of materials include but are not limited to glass, greenhouse film, reinforced poly film, Polygal polycarbonate, GE polycarbonate, corrugated polycarbonate, Solexx, twinwall polycarbonate, triplewall polycarbonate, Lexan™ Thermoclear™ Solar Control, Polycoolite, and Spring polycarbonate, and the like.

The orientation of the solar greenhouse system 100 of the present invention is important to the functionality of the system in order to maximize the capture of incident solar radiation during the cold winter months, particularly in areas within a specific range of latitudes in the Northern and Southern hemispheres. For Northern hemisphere applications, first vertical face 101 and first sloped face 105 must be facing substantially true south (top ridge running substantially east/west), or about 15° east of true south, within an acceptable margin of error. In one embodiment, the acceptable margin of error is about 20° toward the east or about 10° toward the west.

Preferably the orientation of first vertical face 101 and first sloped faced 105 is 15° east of true south such that the vector of the solar rays during the coldest times of winter when the sun is at its peak height on the horizon intersect the horizontal plane of the first sloped face well within the glazing's critical angle for maximizing the winter's sun incoming solar radiation. For Southern hemisphere applications, the orientation is reversed with the first vertical face 101 and first sloped face 105 facing substantially 15° west of true north. The margin of error remains the same but is reversed. In a preferred embodiment, the orientation of first vertical face 101 and first sloped face 105 is about 15° east from true south, which has been determined to maximize winter solar gain early in the morning when the heat is most needed.

In some embodiments, second vertical face or wall 102 is of specific height ("H1") which will allow for the stacking or placement of thermal mass adjacent thereto. For example, if the thermal mass employed by the solar greenhouse system of the present invention are 55 gallon water filled metal barrels (2' in diameter and 3' tall), then a wall or face that is between 6' to 8' in height is suitable when the metal barrels are stacked one on top of the other. A 6' tall second vertical face 102 would be just tall enough for two rows of thermal mass (e.g. 3' tall metal barrels) whereas an 8' tall face more efficiently utilizes standard sized building materials and provides a warm shaded area for plants that do not like direct sunlight. The higher the second vertical face 102, the taller the overall structure, which in turn allows more sunlight into the structure. Likewise, in some embodiments, first vertical face or wall 101 is of a specific height ("H2"). In one embodiment, first vertical face or wall 101 is an adequate height to include intake vents and is up to 4" high to make the best use of standard-sized materials.

As discussed above, the solar greenhouse system of the present invention may utilize thermal mass to absorb and store heat. In some embodiments, the thermal mass material may be a solid, liquid or gas. As described above, the thermal mass used in the present invention may be water-filled containers painted flat black and/or other colors to reflect light in the photovoltaic active radiation spectra or spectrum beneficial to photosynthesis. For example, red and blue containers may be used at levels above the grow bed to reflect light spectra that are the most beneficial to plant growth by increasing available light in wavelengths needed for photosynthesis and incident on plants from multiple directions, thus reducing phototropism. In one embodiment, the water-filled containers are made of metal for efficient energy conduction and radiation. The larger the container, the more heat the container can hold. In some embodiments, the containers are 3' (height)×2' (diameter) and hold 55 gallons of water. 30 gallon containers are also suitable for use in the present invention and other metal containers with other shapes and sizes. During a sunny day, the thermal mass prevents the solar greenhouse system from overheating by absorbing excess heat. During the night or cloudy days, when the interior temperature drops, the thermal mass radiates this stored heat and helps maintain a suitable plant environment inside the solar greenhouse system.

In some embodiments, the thermal mass containers are lined up along the second vertical face 102 and stacked in sets of two. In another embodiment, barrels are also placed along the first vertical face 101 of the solar greenhouse system of the present invention. For example, in one embodiment of a greenhouse 24' in length, one may install ten 55 gallon water containing drums along the first vertical face 101 and twenty 55 gallon water containing drums (stacked in sets of two) on the second vertical face 102. As shown in the embodiment depicted in FIG. 6, ten 55 gallon water-containing drums are shown on the floor lined up against the second vertical face 102. If a second row of drums were stacked on top of the first, there would be a total of 20 water containing drums stacked along the second vertical face 102. Preferably the thermal mass containers are arranged in place and filled after the interior of the solar greenhouse system is finished. Other additives, such as a non-toxic anti-rust additive may be added to the containers as well. Once in place, filled, and sealed, the thermal mass containers should remain substantially stationary to allow for heating to occur. It may take several days to a week for the containers to fully charge with enough heat energy to provide optimal performance.

More thermal mass in various-sized containers may be added throughout the interior space once the growing area is set up. Integrating more thermal mass in the solar greenhouse system of the present invention will reduce the temperature swings and increase stored heat for night and cloudy days. Smaller containers will absorb and release heat faster than larger ones. Larger containers store more heat for longer periods. In addition, sod and the plants themselves act as thermal mass.

In some embodiments, the greenhouse system may use various types of steel or transparent tanks to hold the water. For example in one embodiment, five (e.g. for the 12'×24' model) and seven (e.g. for the 16'×32' model), 300-gal stock tanks measuring 3'×2'×8' may be used. Preferably, the stock tanks are first positioned within the structure and then filled with water. After filling them with water, the tanks as well as the barrels may second as bases for bench tops.

In other embodiments, the thermal mass utilized in the solar greenhouse system of the present invention may comprise a material placed within the wall itself, such as phase change material ("PCM") and the like. PCM is substance with a high heat of fusion which is capable of storing and releasing large amounts of energy. Heat is absorbed or released when the material changes from solid to liquid and vice versa. Therefore, PCMs are classified as latent heat storage (LHS) units. Suitable PCMs may include organic (e.g., paraffin), inorganic (e.g., salt hydrates), eutectics, or hygroscopic materials. In some embodiments, the PCMs utilized will be microencapsulated. Suitable commercially available PCMs include, but are not limited to the BioPCM™ products manufactured and supplied by Phase Change Energy Solutions, Inc. such as BioPCmat™ or Thermostix™. Such materials may comprise a semi-solid gel that absorbs and stores energy as the material heats up and approaches its melting point. As the ambient temperature cools and the PCM transitions back to its original state energy is released over time in the form of heat.

In some embodiments, mats of BioPCmat™ are attached directly to SIPS panels used for construction of the passive solar greenhouse structure. For example, furring strips may be added to the interior facing sides of the panels (facing the inside of the greenhouse) and the mats of thermal mass material are attached thereto. In this example, ½ inch thick mats of BioPCmat™ are used. The mats may be stapled to the furring strips and then the wall finish may be placed over the top of the mats.

Other examples of thermal mass materials that may be used in the present invention include, but are not limited to concrete, clay bricks or other forms of masonry, insulated concrete panels, clay brick, adobe brick or mudbrick, earth, mud, and sod, rammed earth, natural rock or stone. Furthermore, combinations of thermal mass materials may be used. For example, various combinations of water filled containers and PCM may be used for the purposes of the present invention.

First interior angle 111 at the junction 110 between first vertical face 101 and first sloped face 105 (as measured between first sloped face 105 and the horizontal) is important to the functionality of the present solar greenhouse system since first sloped face 105, which must face a substantially southerly direction (in the Northern hemisphere), is where the majority of the incident solar radiation ("insolation") occurs in the system. The first interior angle 111 maximizes winter insolation into the structure for regions lying within the middle latitudes as defined as failing between 23°26'22" North and 66°33'39". North latitude and between 23°26'22" South and 66*33*39" South latitude during the three months preceding and the three months following winter solstice. This feature coupled with other features of the present invention, such as the use of thermal mass, which converts and stores the solar radiation as thermal energy, creates a self-heating structure without the need for supplemental heat sources. Conversely, the first interior angle minimizes insolation within the structure during the three months preceding and the three months following summer solstice.

Referring to FIG. 2, the "critical angle" is the maximum angle (angle of incidence) from the perpendicular of a glazing material that the majority of light striking a transparent surface is transmitted through the material. When the incident angle of the incoming light is greater than the critical angle for that glazing material, the bulk of the light is reflected off the surface instead of being transmitted through the glazing. It has been determined that critical angles vary slightly for different glazing materials—generally within 30° to 40°.

Figure 2:
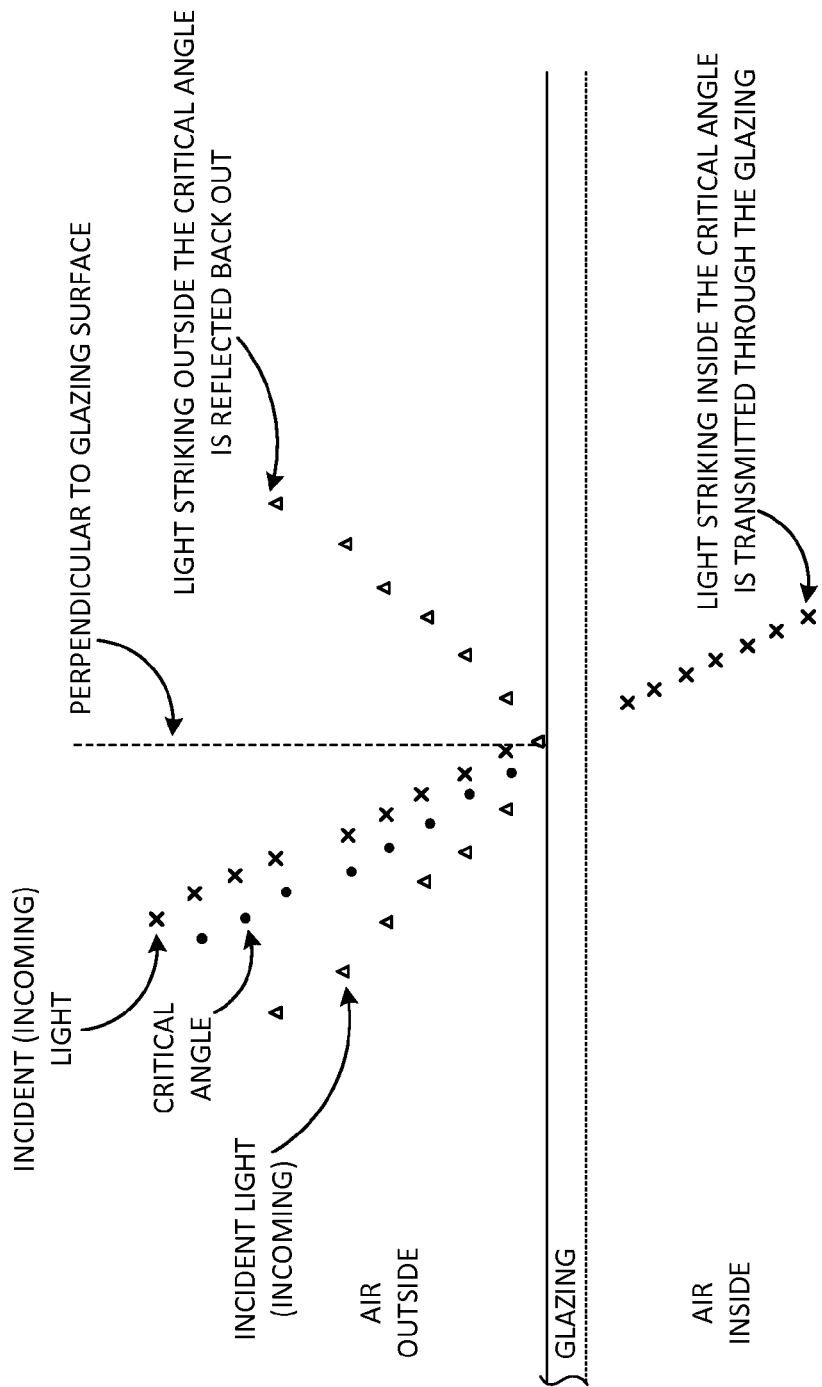
FIG. 2 is a diagram demonstrating the critical angle principle and its relationship to the pitch of first sloped face.
Figure 3A:
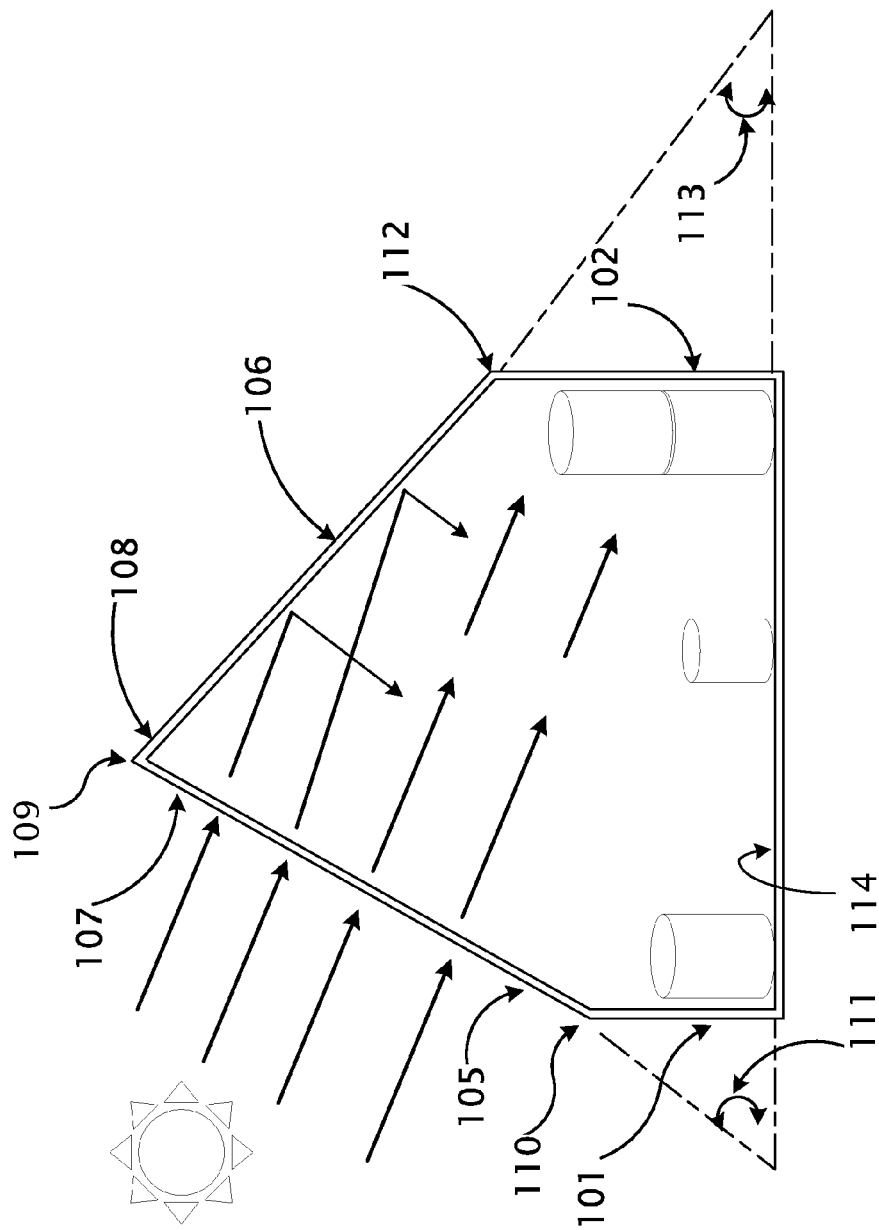
FIG. 3A shows a side perspective of an embodiment of a passive solar greenhouse of the present invention and the interaction with sun ray vectors during colder months of the year.
Figure 3B:
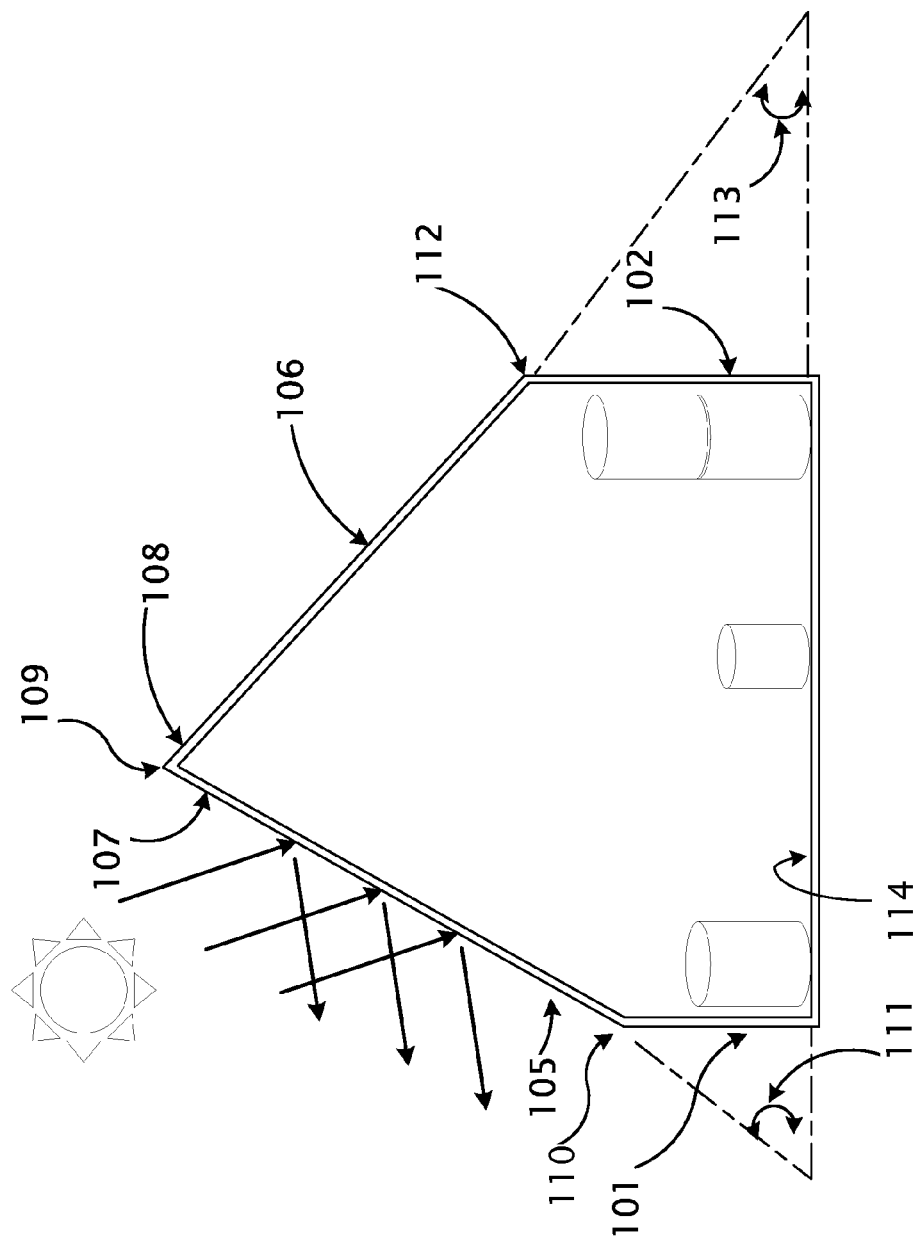
FIG. 3B shows a side perspective of an embodiment of a passive solar greenhouse of the present invention and the interaction with sun ray vectors during warmer months of the year.

In the winter, the passive solar greenhouses of the present invention are designed to capture the early morning sun rays as soon as possible (shortly after sunrise) when the sun is entering the structure close to the horizon. Referring to FIG. 3, it has been determined that to achieve the goals described above, the first interior angle 111 must fell within the range of about 50-75° from the horizontal. In a preferred embodiment as shown in FIG. 2, the first interior angle 111 is between about 60-65° from the horizontal. Preferably, the first interior angle 111 is about 60° from the horizontal. Setting the first interior angle 111 outside the disclosed ranges (for example at a lower angle) reduces the amount of insolation entering the passive solar greenhouse when it is the coldest (early morning just as the sun comes up) and needed most for heat. During other times (spring through fall) of the year if the first interior angle 111 is outside the disclosed ranges (for example at a lower angle) to the horizon it will allow larger amounts of light (and thus heat) to enter the structure when it is not needed and this will increase the overheating of the structure when it is not desirable. Therefore, the angles disclosed above represent the angles for most glazing materials that maximize insolation during winter (or the coldest months) and minimize insolation during summer (warmest months). At these angles, winter sun rays are captured within the structure and used for photosynthesis and heat; however, during the summer months when the sun is higher in the sky and the sun's rays are at a more extreme angle to the glazing, a significant amount of the sunlight is reflected off the glazing which reduces overheating. The design acts like a thermostat. It produces extra heat in the winter during clear days when plants are undergoing maximum photosynthesis and introduces fresh air from the outside while excess heat, humidity and $CO_2$ depleted air are exhausted by our natural, convective ventilation system. As the seasonal temperatures warm, the structure reduces the solar heating input.

Likewise, second interior angle 113 at the junction 112 between second vertical face 102 and second sloped face 106 (as measured between second sloped face 106 and the horizontal) is of critical importance to the functionality of the present solar greenhouse system. A proper angle is necessary to reflect the incoming solar rays back toward the growing space within the structure and on the plants themselves. As the winter sun shines through the first sloped face, a substantial portion of the incoming rays contact the second, sloped face 106 and are redirected toward the plant growing space. Furthermore, in cold, cloudy environments, it may be advantageous to increase the second interior angle 113 in order to expand the aperture of first sloped face 105. However, there is a point of diminishing returns beyond a certain angle. As you increase the back angle, the overall structure gets taller, there is more internal space to heat, and proper ventilation is made more difficult. Therefore, remedial measures must be taken to maximize growth conditions. Referring to FIG. 2, it has been determined that to achieve the goals described above, the second interior angle 113 should fall within the range of 35-75° from the horizontal. In a preferred embodiment as shown in FIG. 2, the second interior angle 113 is about 45° from the horizontal.

It should be recognized that any combination of angles for first interior angle 111 and second interior angle 113 within the ranges described above is suitable for the purposes of the present invention and may be adjusted depending on the local environmental conditions. For example, for extreme overcast conditions, such as those experienced in areas like Buffalo, N.Y. during the winter months, the angle combination may be 60° (first interior angle 111) and 60° (second interior angle 113). Taking all of the above factors into consideration, however, it has been determined that under most environmental conditions, a preferred angle combination for first interior angle 111 and second interior angle 113 is 60° and 45° respectively.

Figure 4:
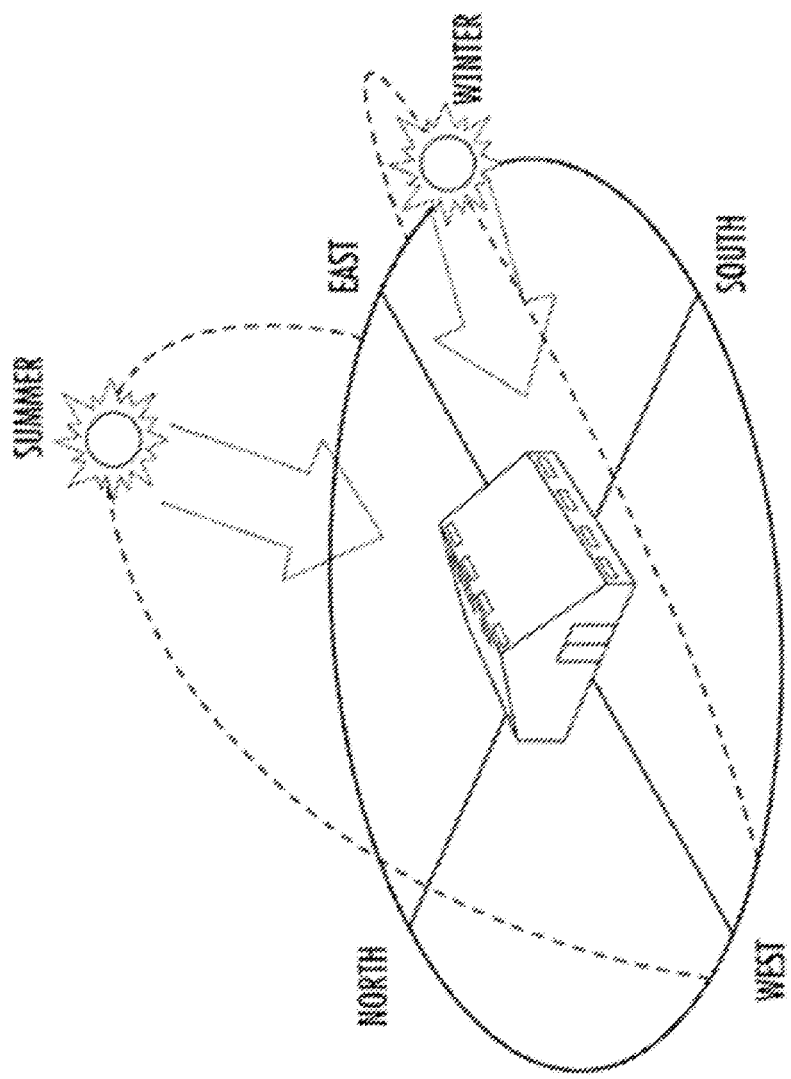
FIG. 4 shows an embodiment of the passive solar greenhouse of the present invention and illustrates the proper orientation of a greenhouse located in the Northern Hemisphere.

The solar greenhouse system of the present invention uses natural, convective flow ventilation by drawing in fresh air when necessary and expelling excess humidity when necessary and preventing overheating during sunny days. This allows temperature control while bringing in fresh air with renewed carbon dioxide levels for the plants. In some embodiments, first vertical face 101 may be used for a variety of purposes and possess three basic configurations: glazed, vented, and solid. With reference to FIG. 4, the ventilation/convection system comprises one or more air intake vents 116, 117, 118, 119, 120 and one or more air exhaust vents 121, 122. In the embodiment depicted in FIG. 4, the air intake vents 116-120 are positioned in the lower third of the vertical height of the solar greenhouse system, preferably within the first vertical face 101 and the air exhaust veins 121-122 are positioned in the upper third of the vertical height, preferably in the two side faces 103, 104 of the solar greenhouse system. The higher the exhaust vent in the structure the more effective the system works.

Figure 5:
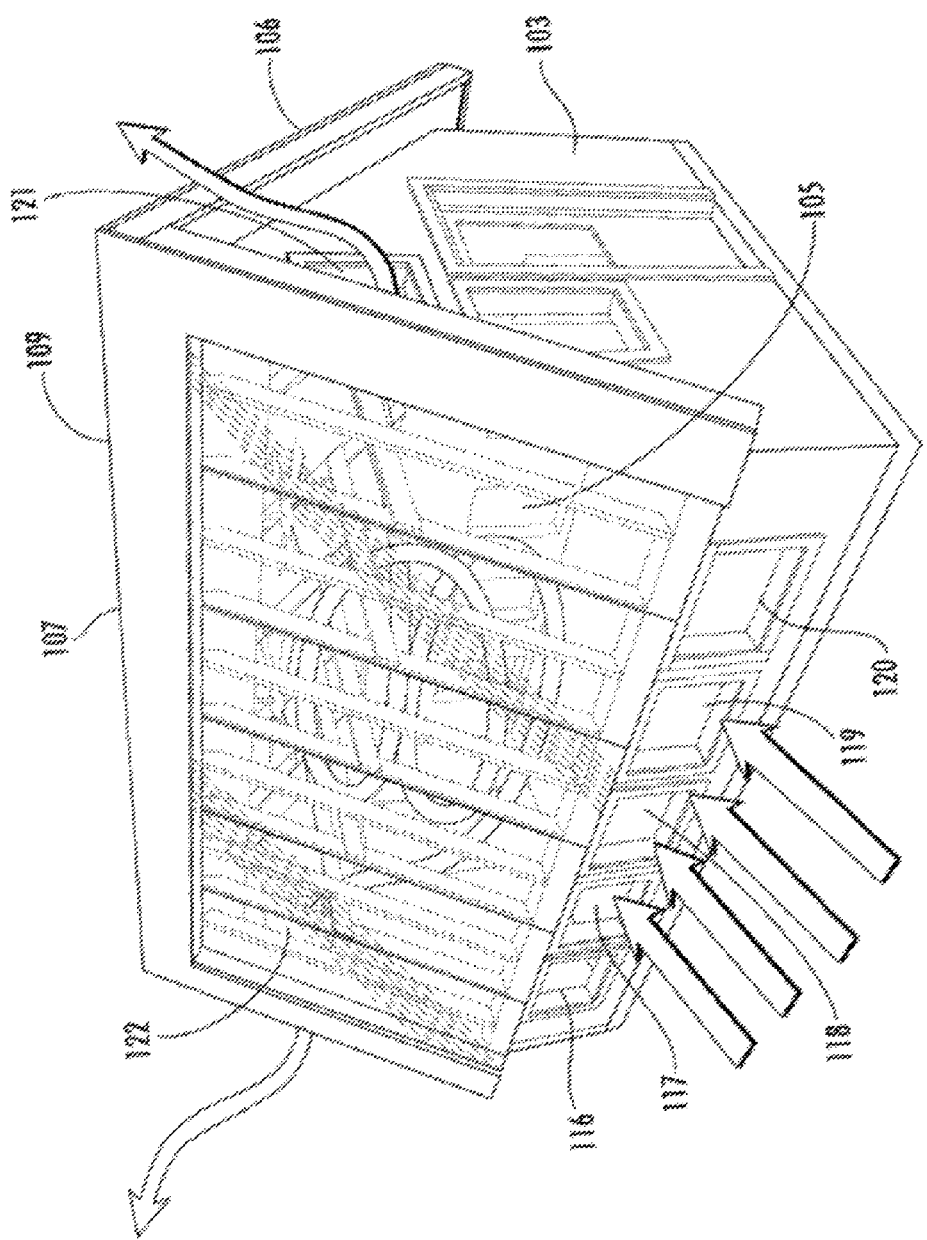
FIG. 5 shows an embodiment of the passive solar greenhouse of the present invention and illustrates the convective flow of air into and through the greenhouse structure.

With continued reference to FIG. 4, the ventilation/convection system of the passive solar greenhouse structure allows a convective airflow during periods of photosynthesis when the outdoor temperature is below the ideal plant growing temperature range for the specific plants being cultivated in the greenhouse. Air intake vents 116-120 may be opened in conjunction with the exhaust vents 121, 122 to create a convective flow. Fresh, drier air with ambient carbon dioxide enters the greenhouse while hot, humid air is exhausted. The rate of air exchanges is controlled by the areas of ventilation and air intake coordinated between the air intake and air exhaust vents. Air intake vents 116-120 may be solar thermal vents to increase the temperature of the incoming outdoor air prior to entry into the structure. In some embodiments, the first vertical face 101 and the air intake vents, such as, for example, an awning window or the like, may include these solar thermal vents into the overall vent assembly. As shown in FIG. 5, the solar thermal vent has a flat, black surface (at least partially) that is heated by solar radiation. When equipped with the solar thermal vents, the outdoor air flows over the solar-heated black surface of the vent and is warmed before entering the structure.

Referring now to FIG. 5, an embodiment of a solar thermal vent as described above is illustrated. In this embodiment, the solar thermal vent comprises a multi-layered sandwich structure. For example, a first layer 123 may be a louvered, flat black (at least partially) metal vent (air intake) with blades angled downward between about 15°-60° from the horizontal. The blades absorb solar energy from the sun and convert it to heat. First layer encounters the outside air first. Second layer 124 may be a "governor" plate with less opening area than the first layer. In one embodiment, the second layer includes diamond-shaped apertures 125 to slow the inward flow of air to collect more heat from first layer 123. Third layer 126 may be a traditional screen insert to further slow air and keep out insects.

Figure 8:
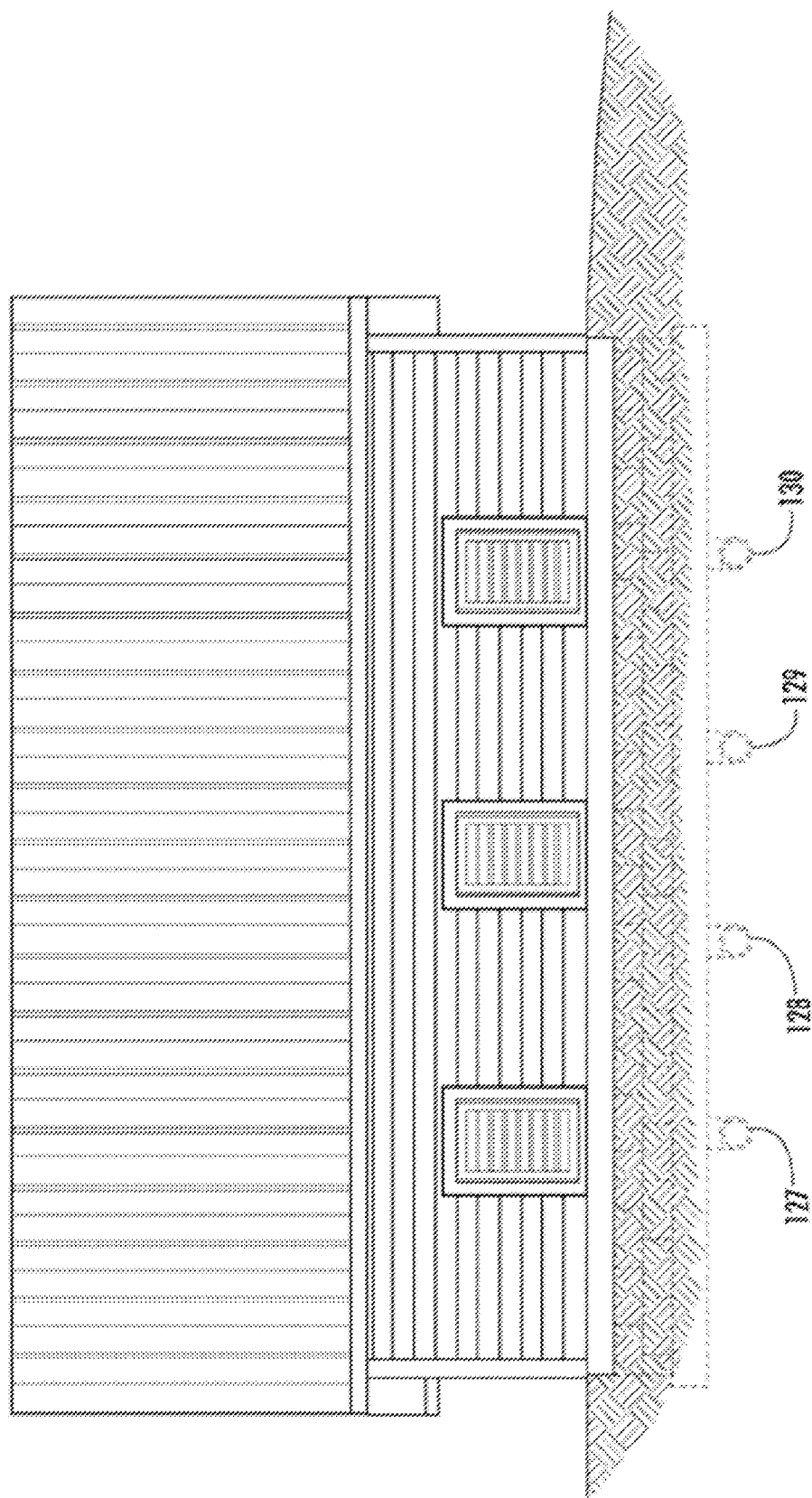
FIG. 8 shows a rear view of an embodiment of a finished passive solar greenhouse of the present invention.

In some embodiments, such as an awning window air intake vent design illustrated in FIG. 8, a vertical U-channel on the interior lower awning window allows the solar thermal vent system to slide down in place. The awning window is opened and the cold, outside air passes through and absorbs heat off solar-heated first layer 123 the air flow rate is slowed down by second layer 124 in order to pick up more heat from solar-heated first layer 123 before entering the greenhouse structure. The flow rate of the pre-heated air entering the greenhouse structure may be controlled by opening and closing the awning window/vents in conjunction with opening and closing the upper exhaust vents to varying degrees according to internal and external conditions.

An exemplary use of the ventilation/convection system may proceed as follows. On a clear winter day with exceptional sunlight shining through the first sloped face by 8:00 a.m., a user may start ventilating by 11:00 a.m. by opening the air intake vents and the exhaust vents. The time a user may open the vents may vary depending on the day length, the geographic location, the amount of sunlight, and/or the interior/exterior temperature. As the interior temperature of the structure drops and it approaches the bottom temperature of the plants' growing range, then the user may close or partially close the vents. If the user does not expect the temperature to drop below the plant growing range, then the user may opt to keep some or all of the air intake vents and air exhaust vents open. Preferably, however, for optimal convection within the structure, the combined open area of air intake vents is substantially equal to the combined open area of the air exhaust vents.

Figure 7:
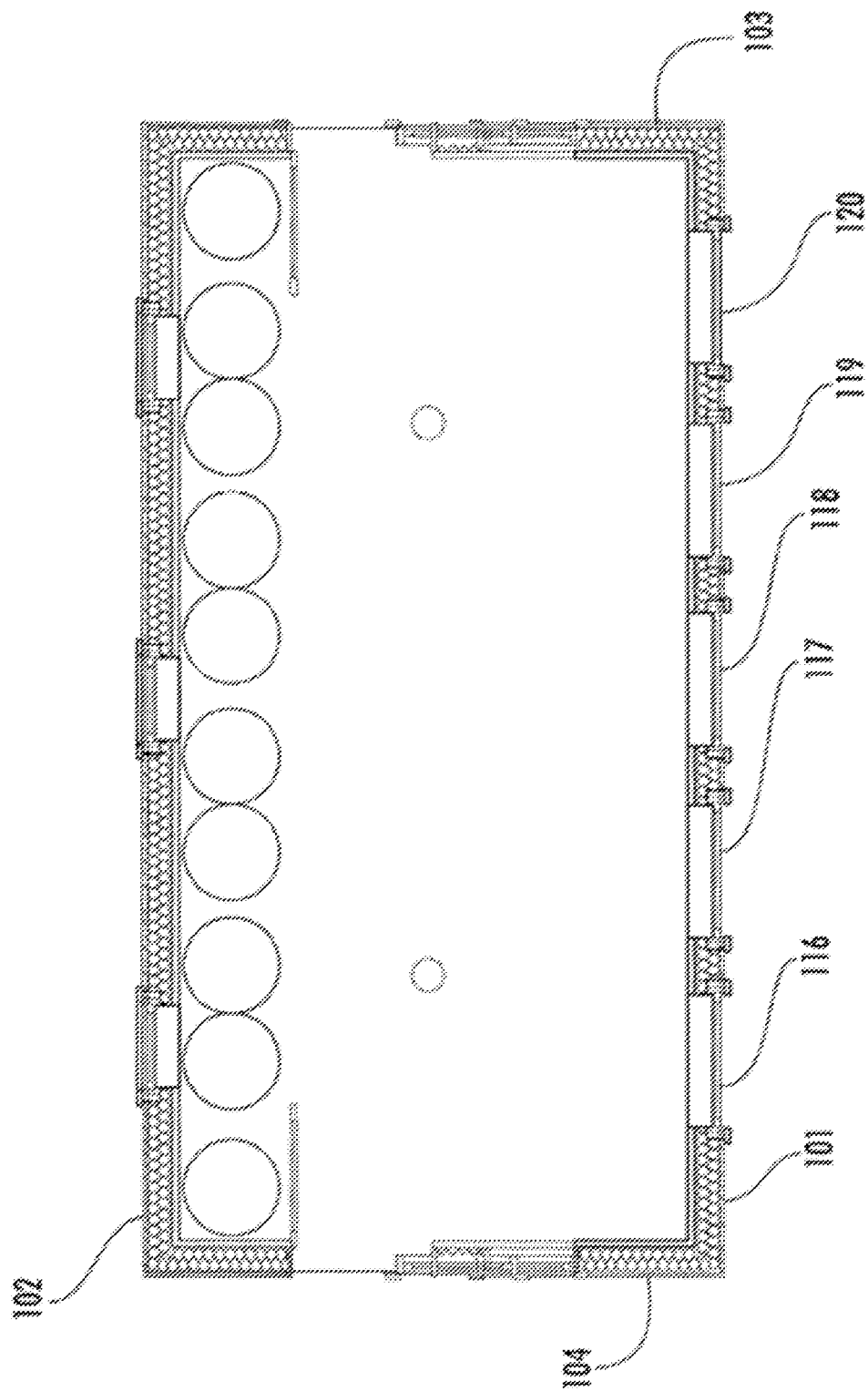
FIG. 7 shows a top-down cross-sectional view of an embodiment of the passive solar greenhouse of the present invention.

In some embodiments, the air intake vents of the present invention may comprise intake pipes 127, 128 129, 130 such as those shown in FIGS. 1, 7, and 8. The intake pipes may be made of various materials including but not limited to polyethylene (PE), polypropylene (PP), acrylonitrile butadiene styrene (ABS), unplasticized polyvinyl chloride (UPVC), post chlorinated polyvinyl chloride (CPVC), polyvinylidene fluoride (PVDF) and the like. In a preferred embodiment, the intake pipes are manufactured from PVC. In one embodiment, the air intake pipes comprise a first open end 131, a central portion 132, and a second open end 133. The first open end 131 is above ground and receives outside air therethrough. The central portion 132 is positioned underground and extends beneath the foundation below the frost line to the north side of the structure where the air intake pipe pipes emerge from the floor and open into the interior of the greenhouse structure. As the air flows through the air intake pipe beneath the foundation and frost line, the air within the pipe is preheated through heat transfer from the interior space of the structure and foundation as well as the increased temperature of the underground terrain. The intake pipes may be opened in conjunction with the air exhaust vents to produce a convective current.

The ratio of the depth, as defined as the distance from the first vertical face to its opposite wall, versus the length, as defined as the distance between the side walls or faces, should be at least 1:2 or greater. For example, in one embodiment, for a 24' long greenhouse, the maximum distance between the first vertical face and its opposite wall should be 12'. In an embodiment located in the Northern hemisphere, as the sun first enters the structure in the morning there is shading on the east side of the structure (created, by the east wall) and later in the day as the sun "moves" to the west side of the structure where there is shading occurring there. The longer the structure is compared to the depth (length of east and west walls) the more sun is available in the center of the greenhouse for photosynthesis and for heat collection by the thermal mass.

The interior surfaces of the faces may have a reflective surface, for example silver or white, which reflects incoming solar radiation in the winter months back toward the plant growing space in the interior of the solar greenhouse system. This increases the amount of natural light reaching the plants compared to the amount of light that same footprint outside of the structure would normally receive during winter months.

The third and fourth vertical faces (103 and 104 respectively) may include doors, glazing, and vents as needed. In a preferred embodiment, lower vents in third and fourth vertical faces are casement windows positioned low on both the faces.

Figure 6:
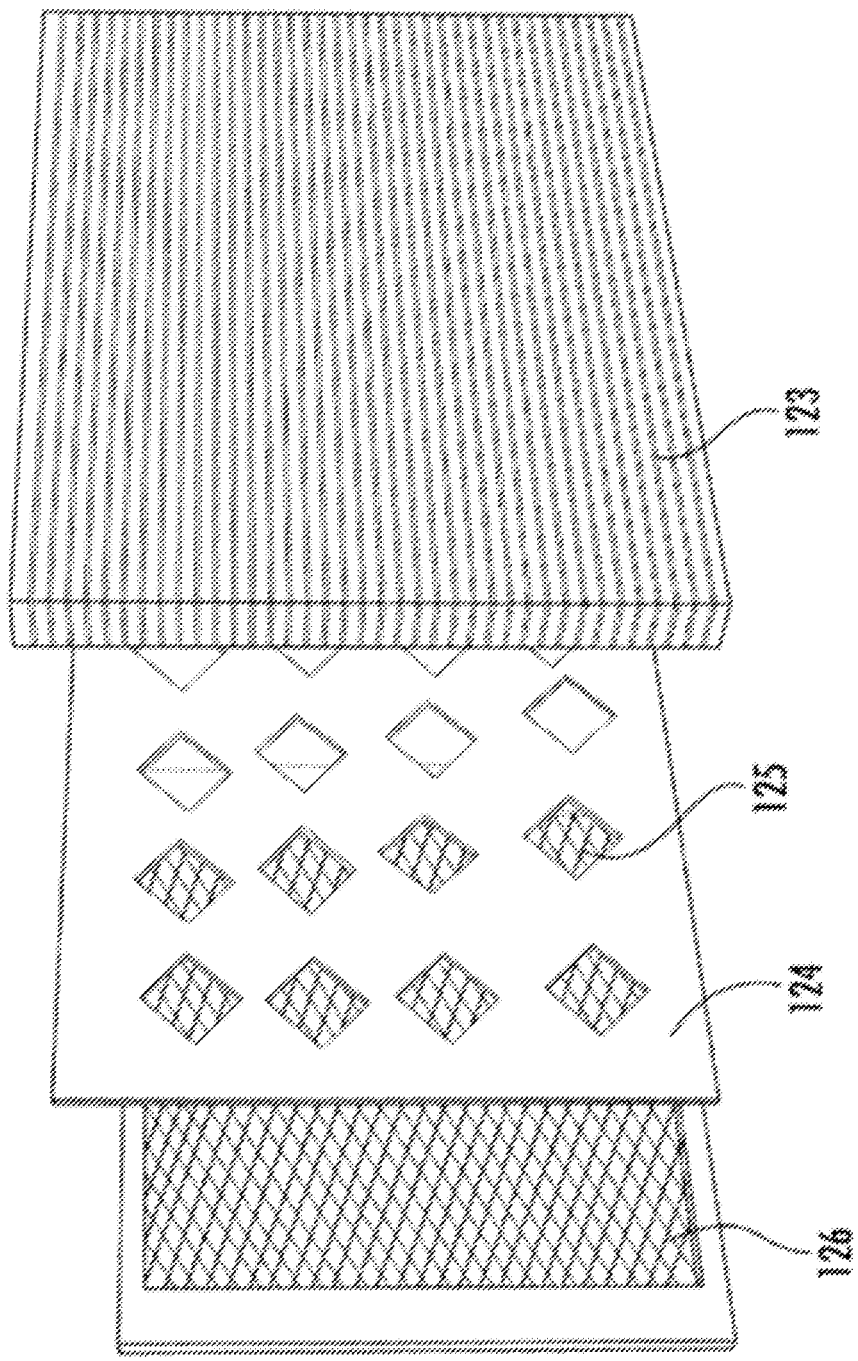
FIG. 6 shows an embodiment of the solar thermal air vent.
Figure 9:
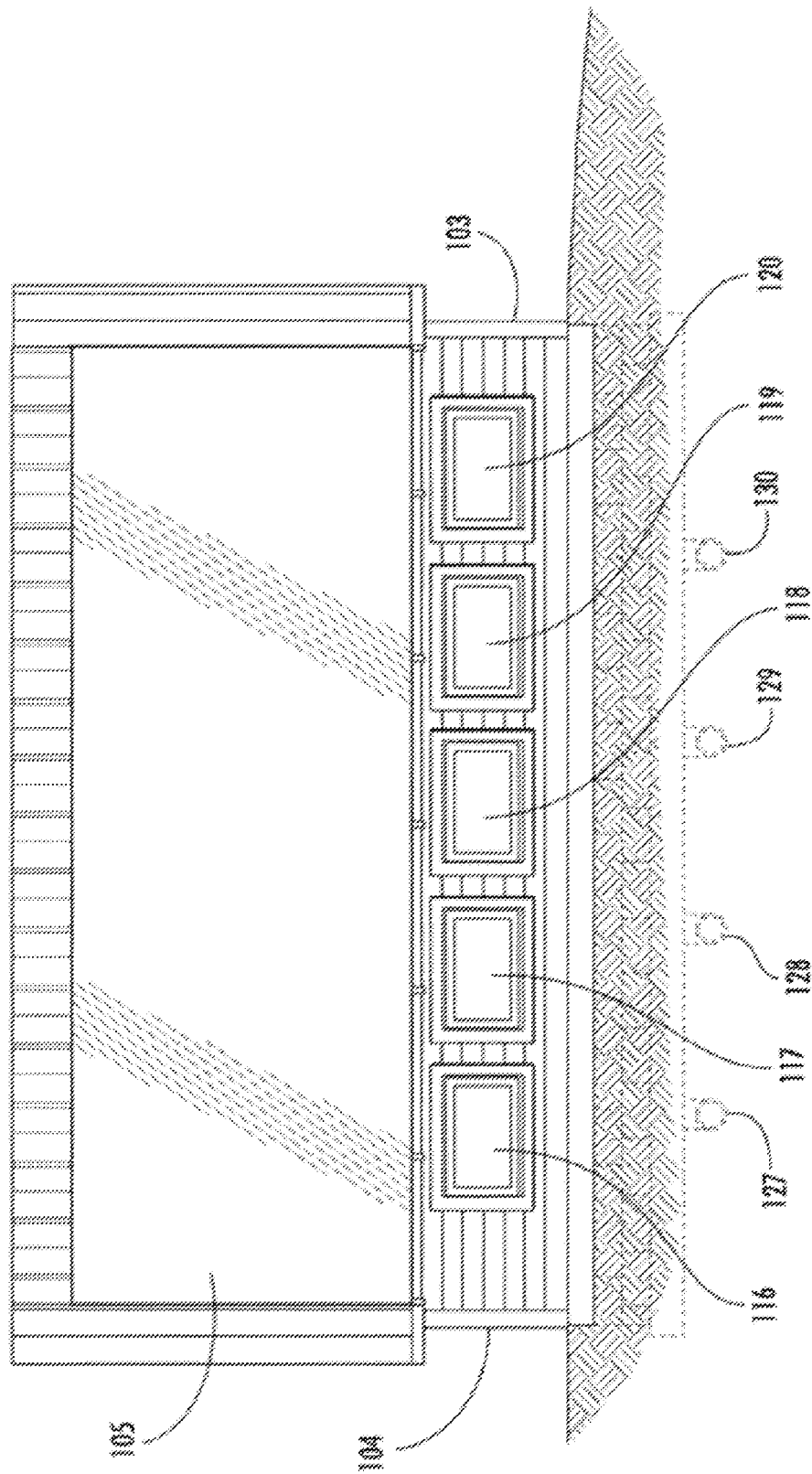
FIG. 9 shows a frontal view of an embodiment of a finished passive solar greenhouse of the present invention.
Figure 10:
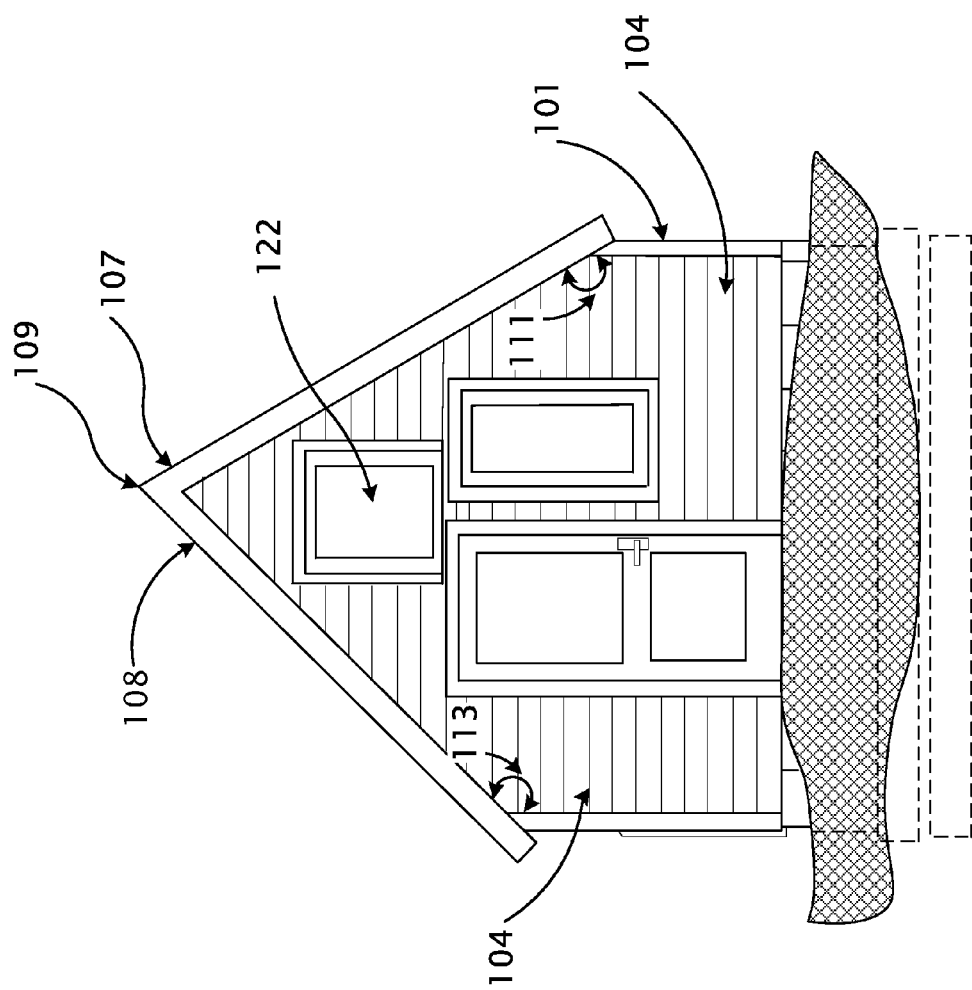
FIG. 10 shows a side view of an embodiment of a finished passive solar greenhouse of the present invention.
Figure 11:
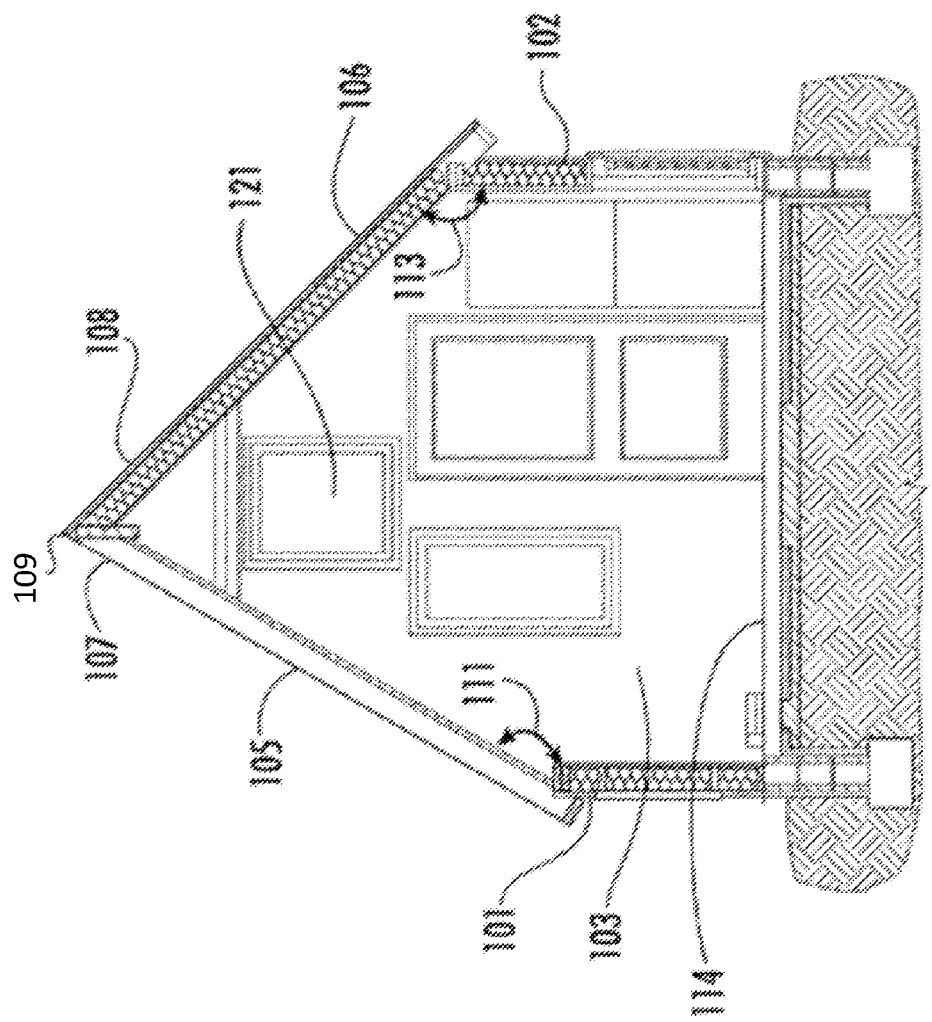
FIG. 11 shows a cross-sectional side view of an embodiment of a finished passive solar greenhouse of the present invention.

The solar greenhouse system may incorporate insulation to slow heat flow through surfaces such as walls, floor, roof, and glazing. As shown in FIGS. 6 and 9, in some embodiments, all vertical faces 101, 102, 103, 104 and the second sloped face 106 are insulated with humidity or water resistant insulation, for example foam board or structural insulated panels (SIPS) and the like. Likewise, the space between all studs and rafters should be insulated. An example of a suitable commercial product on the market for insulation is Prodex® Insulation (reflective-bubble-reflective) which would be installed in the walls, floor, and roof. It acts as a thermal break and vapor barrier and provides an R-value of about 4.9.

Figure 1B:
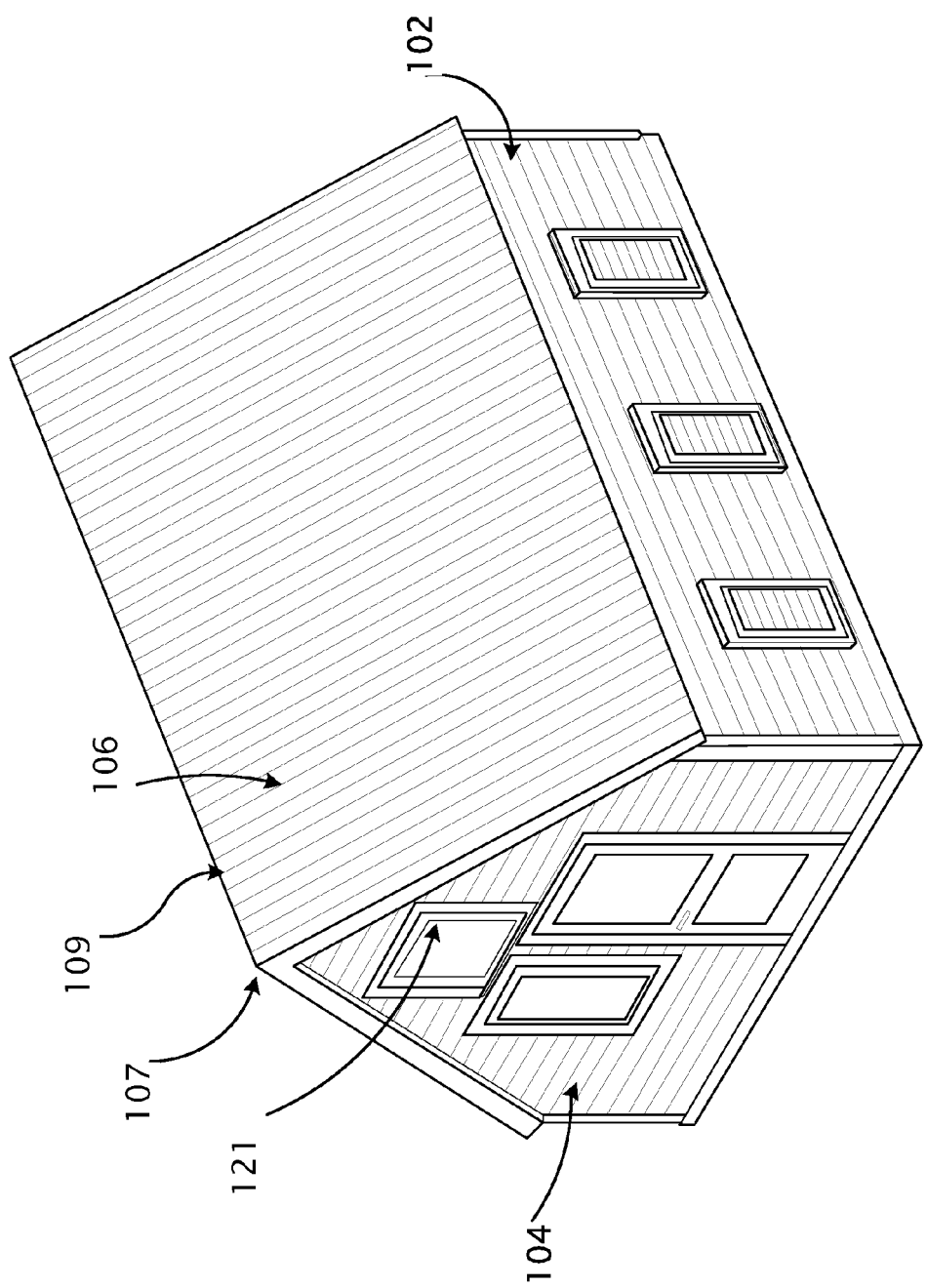
FIG. 1B shows a rearward view of an embodiment of a finished passive solar greenhouse of the present invention.

The solar greenhouse system may furthermore be designed with vents on the second vertical face as shown in FIG. 1B, for example. Such vents may be used as needed to "harden" the plants prior to planting in the spring. The vents may also be opened to cool down the internal temperature during the fall and spring when the external temperatures are higher thereby preventing overheating.

The solar greenhouse system may additionally utilize various coverings to increase performance and efficiency. For example, thermal blankets may be added to cover the glazing surface or first sloped face 105 of the structure to insulate against heat loss through this surface at night.

Interior and exterior surface may be finished to improve the performance of the system. For example, interior walls may be a light color, for example, white or silver, to redirect the sunlight back to the plants. In some embodiments, the surfaces are coated with a waterproof and nontoxic paint. As to the exterior walls and roof, in some embodiments, the exterior surfaces are coated with a light colored paint to reduce nighttime heat loss and summertime overheating.

It should be noted that the greenhouse system of the present invention may be fully automated and/or monitored/controlled remotely via smartphone, computer, tablet or the like. For example, it should be understood that the ventilation/convection system may be fully automated and controlled remotely such that the vents may be opened and closed as needed depending on interior or exterior conditions. Moreover, sensors may be used to fully automate the system wherein modifications and adjustments are programmed and automatically made upon satisfaction of a specific parameter, such as humidity, $CO_2$, or temperature levels with minimal or no manual input. A user may manually monitor temperature, humidity, $CO_2$, and light levels through an electronic device and make operational changes to the vents, lights, and fans. The system may further implement cameras, alarms, and smoke monitors for enhanced security purposes.

The greenhouse system may be manufactured as an easily assembled kit or may come in the form of plans for individual construction. The greenhouse system may be made of earth and human-friendly, energy efficient materials. It may come equipped with a night time insulating curtain that covers the first sloped face providing additional insulation, grow lights for short, overcast winter days, and a low energy input system powered by sustainable energy sources. The greenhouse system may additionally be modified depending on where the greenhouse system will be placed, such as hillside or rooftop.

The examples described below were all located at 36° North latitude.

EXAMPLE 1

Light Management

Triple-glazing was applied on the south facing side of the greenhouse. 35% of the total glazing is in the lower portion and is vertical, and 65% is in the upper portion at 60° angle from horizontal. The angle was determined to be the optimum angle necessary to allow the insolation to enter the structure at local solar noon on December 21 (at a 30° angle from horizontal) for maximum solar gain during the winter months while reflecting much of the solar gain out of the structure in the summer (when the noonday summer sun is at a 77° angle from horizontal). The glazing used was a high-quality polycarbonate glazing with a 71% transmission rate. Interior surfaces were painted a silver color to reflect light onto plants and the thermal mass. The rear angle or pitch of the roof was 30° from the horizontal.
Heat Management Thermal mass was used to store daytime excess heat (reducing overheating and the need to vent this excess heat) and make that heat available for nighttime heating (instead of using expensive fossil fuels for heat): eighteen flat black 55-gallon barrels filled with water were used for thermal mass. The north, east, and west-facing walls and roof were well-insulated, and the roof was painted a light color. Triple polycarbonate glazing with an R-value of 2.5 for south-facing glazing to reduce heat loss through the glazing on cold days and nights. Light colored exterior walls to reduce nighttime radiation heat loss and reduce daytime summer heat gain by absorption.
Ventilation Ventilation at this facility was rudimentary, and the facility was poorly ventilated.
Other Features Gravel was added to the interior floor to allow water through the ground. Foundation insulation was applied outside of the greenhouse system.
Performance The initial mathematical performance model predicted that with this particular design there would be no need for any extra energy other than the sun to achieve an average temperature difference within the greenhouse of at least 25° F.-40° F. above the ambient temperature during the winter months and at the same time not overheat during the summer months. Data collected confirmed this prediction. The average temperature during the winter, when this unit was tested, was approximately 60° F. The low temperature during that period was 48° F. after five overcast days in a row when the thermal mass had no time to recharge.

Figure 14:
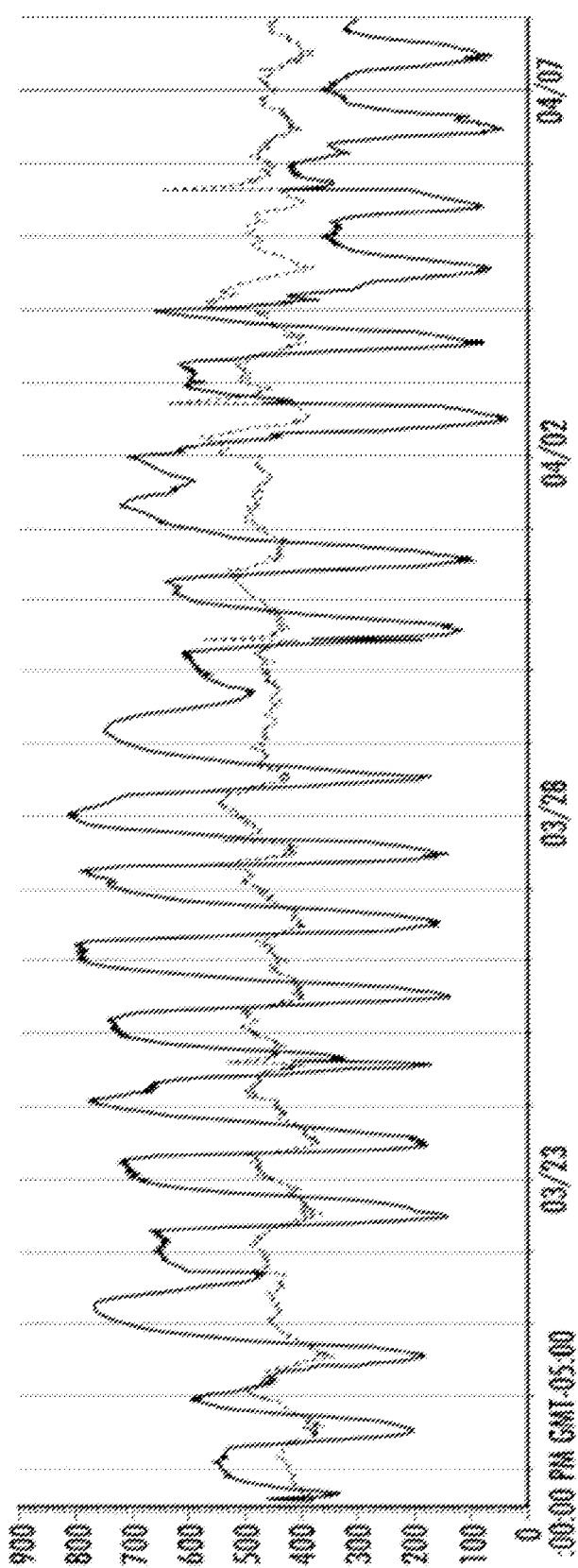
FIG. 14 shows a graphical representation of data taken at an experimental facility reflecting carbon dioxide levels over time.

Referring now to FIG. 14, tests were performed on the passive solar greenhouse design of Example 1 to determine carbon dioxide levels (ppm) in a house with plants on one side and without plants on the other side of the structure (control). The carbon dioxide profile for this testing period showed the experimental side (plants) experienced periods of extreme $CO_2$ depression during the daylight hours. However, at night plant respiration resulted in $CO_2$ levels above ambient until the following day, when the plants could use it again during photosynthesis. The control side remained at the ambient level of carbon dioxide—around 400 ppm.

EXAMPLE 2

Light Management

Triple-glazing was applied on the south facing side of the greenhouse. 35% of the total glazing is in the lower portion and is vertical, and 65% is in the upper portion at a 60° angle from horizontal. The angle was determined to be the optimum angle necessary to allow the insolation to enter the structure at local solar noon on December 21 (at a 30° angle from horizontal) tor maximum solar gain during the winter months while reflecting much of the solar gain out of the structure in the summer (when the noonday summer sun is at a 77° angle from horizontal). The glazing used was a high-quality polycarbonate glazing with a 71% transmission rate. Interior surfaces were painted a silver color to reflect light onto plants and the thermal mass. The rear angle or pitch of the roof was 30° from the horizontal.
Heat Management Thermal mass was used to store daytime excess heat (reducing overheating and the need to vent this excess heat) and make that heat available for nighttime heating (instead of using expensive fossil fuels for heat): 18 flat black 55-gallon barrels filled with water were used for thermal mass and 5 red and 5 blue 55-gallon barrels filled with water to better reflect photosynthetic light from the back of the structure (reduce plant phototropism and increase available light to plants). The roof, and north, east, and west-facing walls were well insulated and painted a light color. Triple polycarbonate glazing with an R-value of 2.5 for south-facing glazing to reduce heat loss through the glazing on cold days and nights. Light colored exterior walls to reduce nighttime radiation heat loss and reduce daytime summer heat gain by absorption.
Ventilation Passive ventilation was used to allow fresh air exchanges during the day. Vents were added to the greenhouse in Example 2 approximately 5-fold more than the greenhouse of Example 1 and designed with the convective system. There were five vents low in the front wall, five vents low in the back wall, and five vents high in the front glazing.
Other Features The 12'×24' structure was built using Structural Insulated Panels or SIPS panel construction for improved insulation to the structure.
Performance Reference is made to FIG. 12 which shows a graph representing a week of data from December 26th through January $1^{st}$ and it shows the following: 1) water temperature of thermal mass; 2) the interior temperature; 3) the outside temperature (green); 4) the relative humidity; and 5) the sunlight levels. This solar greenhouse design is located in the mountains of Western North Carolina, and two lower vents and two upper vents were opened slightly in the morning on sunny days and closed late afternoon. The upper vents release excess heat and humidity while the lower vents bring in fresh air. All temperatures are presented in ° F.

Figure 12:
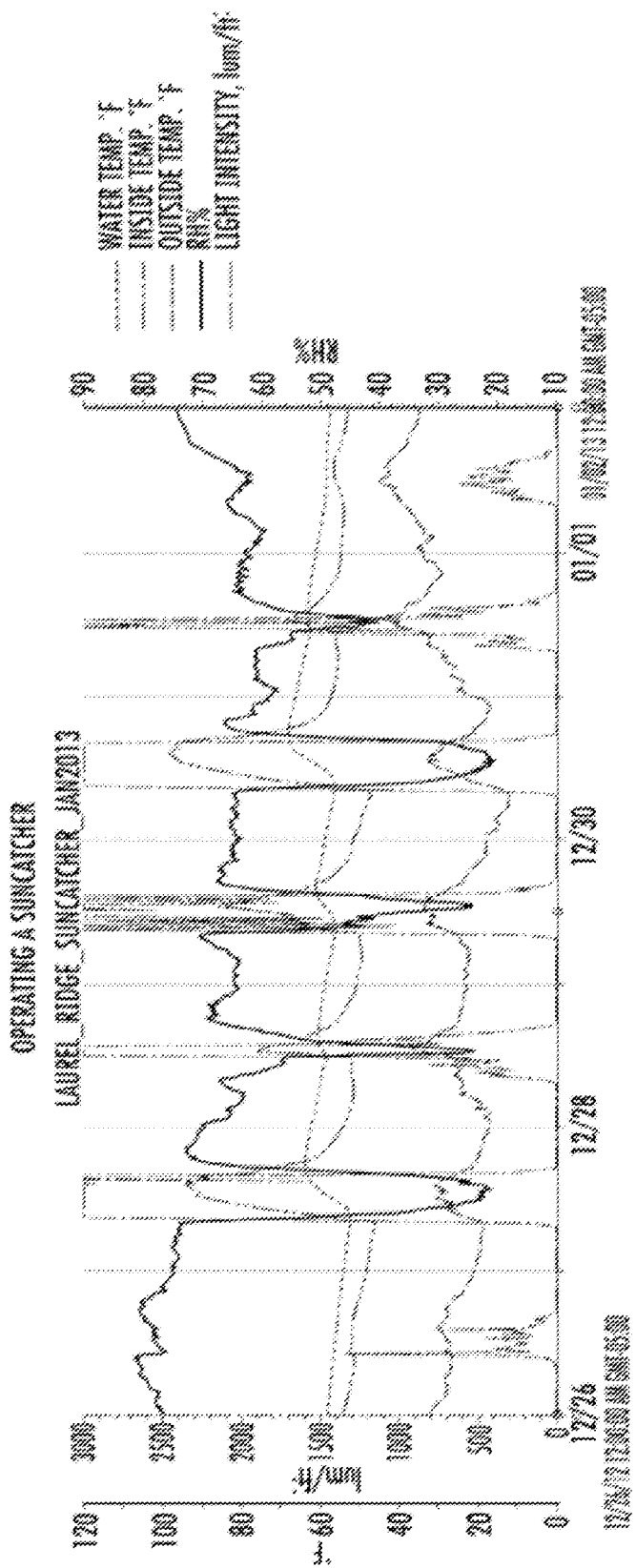
FIG. 12 shows a graphical representation of data taken at an experimental facility during a four-day period reflecting water temperature, inside temperature, outside temperature, RH %, and light, intensity.

With continued reference to FIG. 12, the graph begins at 12 a.m. on December 26th and the outside temperature drops through most of this 24-hour period from 30° to 20°. It was an extremely cloudy day as indicated by the line staying very low all during the daylight hours. Note that around 11 a.m. the sun briefly intensifies, and the interior temperature immediately rises and maintains the temperature. The interior temperature stays 25° higher than the outside during this cold, cloudy day and is heated, by the water, which shows its temperature dropping as it releases its heat to the greenhouse. The vents are not opened on this day, and the plants are not photosynthesizing because the sunlight levels are too low. The humidity stays around 75-80%.

As shown in FIG. 12, at 12 a.m. on December 27th the temperature is 20° F. and drops to 19° F. just before the sun comes out for a clear day, the opposite of the day before. The interior temperature rapidly increases from the solar heating, and the plants are performing maximum photosynthesis. The interior temperature peaks at 90° F. even with the two vents cracked. The vents could have been opened wider to release more heat which would in turn bring in more fresh air with renewed $CO_2$. The thermal mass is recharged by the sunlight after losing some heat the day before because of the cloud cover. During the day, there is a 65° F. difference between the outside temperature of 30° F. and the inside. Humidity levels drop to 20% because of the ventilation.

It was noted that the addition of a night shade would increase performance of this system. The shade covered the south-facing glazing and significantly reduced heat loss at night. The nightly troughs in the interior temperature and water temperature are providing more stored heat in the thermal mass for longer periods of time.

Figure 13:
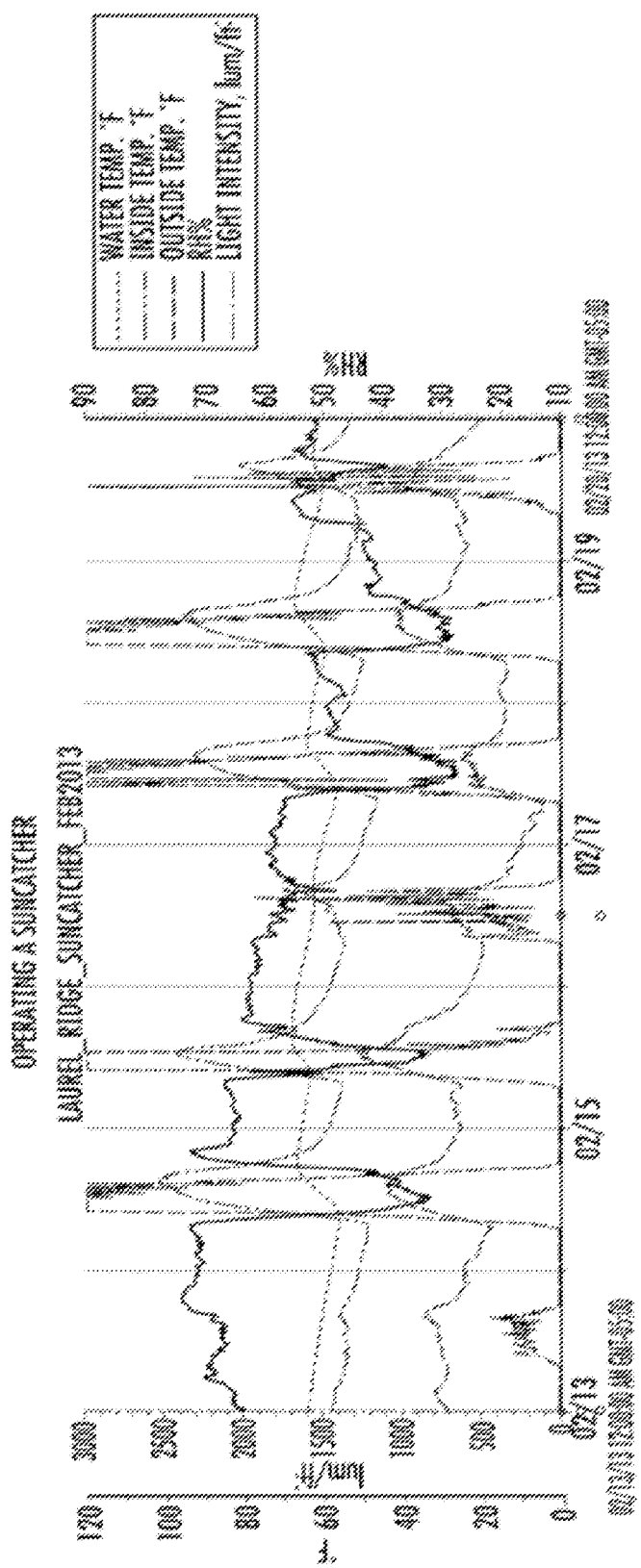
FIG. 13 shows a graphical representation of data taken at an experimental facility during a four-day period reflecting water temperature, inside temperature, outside temperature, RH %, and light intensity.

Referring now to the graph shown in FIG. 13, this passive solar greenhouse design experienced one of the coldest nights on February $17^{th}$. The prior day was very cloudy and the interior temperature only rose to 70° F. That night the outside temperature plummeted to 3° F., but the interior temperatures only dropped to the 50° F. mark. The humidity levels stayed within the 30-70% range. The line indicating sunlight intensity shows that February $13^{th}$ was a mostly cloudy day while February $14^{th}$ started clear in the morning but later in the day it became cloudy. For most of the week, the outside temperature was in the 20-40° F. range while the interior stayed in the 50-90° F. range. It again was noted that the use of a nighttime shade would insulate the glazing from lost heat at night which may boost thermal performance by 30%.

EXAMPLE 3

Light Management

Triple-glazing was applied on the south facing side of the greenhouse. A larger aperture was used to allow more sunlight into structure; in other words, the solar collecting surface was large compared to the interior floor space of the greenhouse. 0% of the total glazing is in the lower portion and is vertical, and 100% is in the upper portion at a 60° angle from horizontal. The angle was determined to be the optimum angle necessary to allow the insolation to enter the structure at local solar noon on December 21 (at a 30° angle from horizontal) for maximum solar gain during the winter months while reflecting much of the solar gain out of the structure in the summer (when the noonday summer sun is at a 77° angle from horizontal). The glazing used was a high-quality polycarbonate glazing with a 71% transmission rate. Interior surfaces were painted a light silver color to reflect light onto plants and the thermal mass. The rear angle or pitch of the roof was 45° from the horizontal.

Heat Management

Thermal mass was used to store daytime excess heat (reducing overheating and the need to vent this excess heat) and make that heat available for nighttime heating (instead of using expensive fossil fuels for heat): twenty-two flat black 55-gallon barrels (and eleven red and eleven blue) filled with water were used for thermal mass. The roof north, east, and west-facing walls were well insulated and painted a light color. Triple polycarbonate glazing with an R-value of 2.5 for south-facing glazing to reduce heat loss through the glazing on cold days and nights. Light colored exterior walls to reduce nighttime radiation heat loss and reduce daytime summer heat gain by absorption.

Ventilation

An underground passive ventilation system was applied. Underground pipes were used to pre-warm cold winter air before it entered the structure. Passive ventilation was also used to allow fresh air exchanges during the day. This provided constant warm, less humid air flow with ambient levels of $CO_2$.

Other Features

The 18'×46' structure was built using Structural Insulated Panels or SIPS panel construction for improved insulation to the structure.

The foregoing description of an implementation has been presented for purposes of illustration and description. It is not exhaustive and does not limit the claimed inventions to the precise form disclosed. Modifications and variations are possible in light of the above description or may be acquired from practicing the invention.

The invention claimed is:

1. A passive solar greenhouse comprising a first vertical face, a second vertical face, a first sloped face, a second sloped face, a first side wall, a second side wall, at least one air intake element in the first vertical face, at least one air exhaust element in first side wall or second side wall, thermal mass, a first interior angle between the first sloped face and the horizontal plane, and a second interior angle between the second sloped face and the horizontal plane, wherein the first interior angle is a predetermined angle based in part on the critical angle of the first sloped face that promotes maximum transmission of low angle winter direct sunlight through the first sloped face and into the passive solar greenhouse.

2. The passive solar greenhouse of claim 1 wherein the first interior angle is between about 50° and about 75° from the horizontal.

3. The passive Solar greenhouse of claim 1 wherein the first interior angle is between about 60° and about 65° from the horizontal.

4. The passive Solar greenhouse of claim 1 wherein the first interior angle is about 60° from the horizontal.

5. The passive solar greenhouse of claim 1 wherein the second interior angle is between about 35° and about 75° from the horizontal.

6. The passive solar greenhouse of claim 1 wherein the second interior angle is about 45° from the horizontal.

7. The passive solar greenhouse of claim 1 wherein the first vertical face and second vertical face are each facing substantially true south within a margin of error of about 20° toward the east or about 10° toward the west when the passive solar greenhouse is located in the Northern hemisphere.

8. The passive solar greenhouse of claim 1 wherein the first vertical face and second vertical face are each facing substantially true south within a margin of error of about 20° toward the west or about 10° toward the east when the passive solar greenhouse is located in the Southern hemisphere.

9. The passive solar greenhouse of claim 1 wherein the at least one air intake element further comprises a solar thermal vent.

10. The passive solar greenhouse of claim 9 wherein the solar thermal vent is a multi-layered structure further comprising a louvered plate, a governor plate with at least one aperture, and a screen.

11. The passive solar greenhouse of claim 10 wherein the louvered plate further comprises blades that are angled downward at between about 15° and 60° from the horizontal.

12. The passive solar greenhouse of claim 1 wherein the thermal mass comprises at least one water-filled container.

13. The passive solar greenhouse of claim 1 wherein the thermal mass comprises at least one water-filled container with a black exterior coating, at least one water-filled container with a red exterior coating, and at least one water-filled container with a blue exterior coating.

14. The passive solar greenhouse of claim 1 wherein the thermal mass comprises a phase change material attached to the walls of the structure.

15. A method of optimizing plant growth conditions within a passive solar greenhouse comprising the steps of:
providing a passive solar greenhouse comprising a first vertical fate, a second vertical face, a first sloped face, a second sloped face, a first side wall, a second side wall, at least one air intake element, at least one air exhaust element, and thermal mass;
building the first sloped face such that its pitch is between about 50° and about 75° from the horizontal wherein the pitch is predetermined and based in part on the critical angle of the first sloped face that promotes maximum transmission of low angle winter direct sunlight through the first sloped face and into the passive solar greenhouse;
building the second sloped face such that its pitch is between about 35° and about 75° from the horizontal such that incoming direct solar radiation is reflected onto the plants thereby reducing phototropism; and
positioning the first vertical face and first sloped face such that it faces substantial due south within a margin of error of about 20° toward the east or about 10° toward the west when the passive solar greenhouse is located in the Northern hemisphere.

16. The method of optimizing plant growth conditions within a passive solar greenhouse of claim 15 further comprising the steps of supplying at least one container to hold the thermal mass and coating the exterior of the at least one container with either black, red, or blue coating material for proper absorption or reflectivity of light depending on need.

17. The method of optimizing plant growth conditions within a passive solar greenhouse of claim 15 wherein the thermal mass is water contained within containers.

18. The method of optimizing plant growth conditions within a passive solar greenhouse of claim 15 wherein the thermal mass is a phase change material attached to at least one wall of the structure.

19. The method of optimizing plant growth conditions within a passive solar greenhouse of claim 15 further comprising the step of promoting a conventional flow of exterior air through the passive solar greenhouse by opening the air intake element a defined aperture area as interior temperature, humidity, and carbon dioxide conditions dictate and simultaneously opening the air exhaust element the same aperture area.

20. The method of optimizing plant growth conditions within a passive solar greenhouse of claim 15 wherein the air intake element and the air exhaust element comprise screened windows.

21. The method of optimizing plant growth conditions within a passive solar greenhouse of claim 15 wherein the air intake element comprises a solar thermal vent system.

22. The method of optimizing plant growth conditions within a passive solar greenhouse of claim 15 wherein the pitch of the first sloped face is between about 60° and about 65° from the horizontal.

23. The method of optimizing plant growth conditions within a passive solar greenhouse of claim 15 wherein the pitch of the first sloped face is about 60° from the horizontal.

24. The method of optimizing plant growth conditions within a passive solar greenhouse of claim 15 wherein the pitch of the first sloped face and the second sloped face is about 45° from the horizontal.

* * * * *